United States Patent [19]

Grieb et al.

[11] Patent Number: 5,083,723
[45] Date of Patent: Jan. 28, 1992

[54] AIR-DRIVEN, TURBINE TOW REEL MACHINE CONTROLLED ACCORDING TO TOWLINE VELOCITY AND VENT DOOR POSITION

[75] Inventors: Paul Grieb, Huntsville; Donald Deaton, Madison, both of Ala.; Harry Collison, New Smyrna Beach, Fla.

[73] Assignee: Teledyne Industries, Inc., Los Angeles, Calif.

[21] Appl. No.: 627,330

[22] Filed: Dec. 14, 1990

[51] Int. Cl.$^5$ .................................. B64D 3/02
[52] U.S. Cl. .................. 244/1 TD; 254/360; 415/144; 244/3
[58] Field of Search ............ 244/1 TD, 3; 254/272, 254/267, 360; 242/54 R; 415/144, 145

[56] References Cited

U.S. PATENT DOCUMENTS

| | | | |
|---|---|---|---|
| 2,088,693 | 5/1963 | Brown | 244/3 |
| 2,751,167 | 6/1956 | Hopper et al. | 244/1 TD |
| 2,760,777 | 8/1956 | Cotton | 244/3 |
| 2,770,584 | 1/1957 | Wilson. | 244/3 |
| 2,778,584 | 1/1957 | Wilson | 244/3 |
| 2,813,719 | 11/1957 | Hopper | 244/1 TD |
| 2,848,179 | 8/1958 | Troxell et al. | 244/3 |
| 2,892,599 | 6/1959 | Baldwin et al. | 244/3 |
| 2,919,869 | 1/1960 | Hopper et al. | 244/3 |
| 3,248,043 | 4/1966 | Taplin et al. | 60/39.281 |
| 3,340,883 | 9/1967 | Peternel | 415/15 |
| 3,416,058 | 12/1968 | Hill et al. | 388/823 |
| 3,474,349 | 10/1969 | Ellermeyer | 330/99 |
| 4,217,754 | 8/1980 | Schmidt-Roedenbeck et al. | 60/39.281 |
| 4,298,310 | 11/1981 | Blotenberg | 415/1 |
| 4,339,226 | 6/1982 | Lee | 415/15 |
| 4,356,984 | 11/1982 | Worth et al. | 244/1 TD |
| 4,496,159 | 1/1985 | Dugan et al. | 244/3 |
| 4,496,159 | 1/1985 | Dugan et al. | 244/3 |
| 4,639,649 | 1/1987 | Seto | 388/813 |
| 4,651,518 | 3/1987 | McLaughlin et al. | 60/39.02 |
| 4,770,368 | 9/1988 | Yates et al. | 244/1 TD |

OTHER PUBLICATIONS

Technical Manual . . . Tow Target Reeling Machine Launcher System A/A47U-3 [RMK-19] Navy Navair 28-10A-16 (1979).
Electronic Instruments, Greenwood, Holdam and MaCrae, Radiation Laboratory Series, No. 21, copr. 1948, pp. 322-329, 347-350.
Introduction To Control Systems Design, by Virgil W. Eveleigh, Copr. 1972, pp. 220-222.
Control System Technology, by C. J. Chesmond, cpr. 1982, pp. 298-305.
Automatic Feedback Control Synthesis, by John G. Truxal, copr. 1955, sec 1.7.
Electronics Engineer's Handbook (2 ed copr. 1982), Fink and Christansen editors, pp. 17-40 to 17-61.
A/A 47U-3 [RMK-19] Tow Target Reeling Machine Launcher System (Revised), (1974).
Navy Standard Tow Target System, U.S. Navy, (Jul. 6, 1983).
Preliminary Technical Manual . . . Tow Target Reeling Machine Launcher System A/A47U-3 [RMK-19].

Primary Examiner—Joseph F. Peters, Jr.
Assistant Examiner—Linda L. Palomar
Attorney, Agent, or Firm—Beveridge, DeGrandi & Weilacher

[57] ABSTRACT

A reeling control system and an air driven tow reel machine incorporating such a control system are disclosed. In the disclosed control system and reeling machine of the present invention, towline velocity is monitored and reel-in and reel-out operations are regulated according to a programmed towline velocity profile. A position sensor senses the position of the turbine vent doors and a velocity sensor device provides the instantaneous towline velocity. A velocity comparator compares the instantaneous towline velocity with a desired velocity value from a desired velocity profile. Based upon the difference between actual and desired towline velocities, a door control device generates a driving signal for controlling the vent door position accordingly.

43 Claims, 6 Drawing Sheets

FIG. 6C

AIR-DRIVEN, TURBINE TOW REEL MACHINE CONTROLLED ACCORDING TO TOWLINE VELOCITY AND VENT DOOR POSITION

BACKGROUND OF THE INVENTION

The present invention relates to reeling machines which deploy and reel-in aerial gunnery tow targets from flying aircraft and control devices for regulating operation of such reeling machines according to towline velocity and vent door position.

In the field of automatically controlled reeling machines fitted to aircraft for reeling in and reeling out aerial gunnery targets, emphasis has been placed on regulating the rate at which the gunnery target is reeled-out or reeled-in. A type of conventional reeling machine incorporates a system for controlling turbine rotational speed. According to U.S. Pat. No. 4,770,368, an analog feed back loop is utilized in regulating the turbine speed. A tachometer provides a voltage representative of instantaneous turbine speed. The instantaneous turbine speed signal is subtracted from a reference voltage to produce an error voltage, and the error voltage is used to drive a servomotor which changes the position of the reeling machine's vent doors so as to reduce the error voltage. The vent door position, of course, controls the volume of air flowing through the turbine and thus regulates turbine rotor speed and direction.

Another general type of reeling machine provides for control according to tow cable speed rather than turbine speed. Reeling control based upon towline speed is advantageous over control according to turbine speed because, even if turbine speed is held constant, if not controlled directly, towline speed will vary as the effective tow reel diameter changes as towline is reeled-off or reeled-on the tow reel.

U.S. Pat. No. 4,496,159 shows an aerial gunnery target and reel system disclosed as including an electromechanical means. According to the patentees, the electro-mechanical means may include an electronic speed control means which, although it is not shown in the patent drawings is said to comprise a closed loop servo wherein actual cable speed is compared with commanded cable speed. The electro-mechanical means regulates the condition of a butterfly valve which in turn controls the volume of airflow for driving the turbine. As the target nears the reeling machine housing, cable reeling velocity is reduced by gradually closing an air inlet valve until a locking arm engages the target whereupon the valve is fully closed and a brake is applied.

Conventional reeling machines and control systems therefor are understood to make no provision for monitoring instantaneous vent door positions. If, for example, during a high speed flight, the vent doors are left open, due to component failure or even pilot error, the turbine torque may overcome the system brakes, resulting in turbine overspeed. Overspeed conditions frequently can cause extensive damage to the reeling equipment. Instantaneous vent door position therefore must be monitored to ensure that the doors are in a desired position during a reeling operation and to permit verification that the vent doors are closed and locked at all times other than during a reeling operation. In addition to component failure or power failures which may result in improperly leaving open the vent doors, conventional systems often are not equipped to adequately respond to sensor failures or counting circuitry failures. Loss of sensor data from, for example, the tachometer in a conventional machine could result in failure of its controller to slow the rotational speed of the tow reel. Thus, during a reel in operation, the target may impact the tow reel at full speed thereby causing extensive damage to both the tow reel and the target. These events are increasingly dangerous if the pilot has no indication in the cockpit that the system has failed, until a catastrophic failure occurs.

Still further, conventional systems utilizing feedback loop arrangements are often adversely affected by electromagnetic noise. Electromagnetic noise may appear as a signal causing the device mechanism for the vent doors to improperly adjust the position of the doors in response to the noise signal.

SUMMARY OF THE INVENTION

A reeling control system and a reeling machine in accordance with the present invention monitor the towline velocity and controls reeling operation based upon desired velocity profiles, rather than turbine speed. Accordingly, the controller of the present invention comprises velocity sensors which provide velocity signals representative of the instantaneous velocity of the towline as it is being reeled-out or reeled-in. For accurate safe control, the system according to the present invention further comprises position sensors which indicate the position of the reeling machine vent doors to provide for monitoring of the vent door positions at all times during a target practice mission.

In the preferred embodiments, a digital door control element determines a desired vent door position based upon stored towline speed information. The door controller compares data representative of the actual vent door position as sensed by door position sensors with the calculated, desired door position. If the desired and actual vent door positions are not the same, the door controller generates a driving signal which is applied to drive a motor for adjusting the position of the vent doors.

In order to calculate the desired door position, feedback in the form of the towline speed and direction from the velocity sensors also is provided to the door control element. Digital means determine the actual towline velocity based on velocity data from the velocity sensors. The calculated towline velocity is compared to a velocity profile stored in memory and a difference signal is applied to the door control element which in turn corrects for the difference by causing adjustment of the vent door positions.

In this way, towline velocity, not turbine speed, is monitored and controlled to accurately regulate the deployment and reel-in of the towline and target. The controller and reeling machine of the present invention cause the turbine to seek and change speeds in response to towline velocity. Accordingly, the towline and tow target can be reeled-out or reeled-in at a substantially constant, preselected rate. Moreover, the manner of control set forth in connection with the present invention is highly immune to electromagnetic noise. The disclosed system has more tolerance for electromagnetic noise because of its preferred digital implementation. Also, it reduces wear on the towline and/or reel brakes, and reduces shock and vibration in the reeling machine. Further, control according to the present invention is very precise and allows for increased reel-in and reel-out speeds. Since towline velocity is controlled automatically by a programmed velocity profile, the resulting reeling apparatus is provided with increased capability for accommodating longer tows, new missions at different target reel-in and reel out speeds, and performance with custom reels.

When it is desired to deploy or reel-out the target, the controller regulates release of the target according to a stored, reel-out velocity profile providing for a smooth upward ramp in towline velocity During deployment, the vent doors are positioned to provide for turbine braking action on the tow reel while wind drag automatically deploys the target. The towline is monitored until the target approaches the desired deployment length whereafter the vent is adjusted to ramp down the deployment velocity. After the target is deployed, the controller causes the vent doors to completely close and lock.

At the end of a target practice mission, when the controller is provided with power, a check is first performed to ascertain that the vent doors are closed and thereafter the doors are opened to a certain degree prior to release of the turbine and/or reel brake in order to counter drag on the target as the brake is released. The vent doors are further opened to cause the towline velocity to ramp up, or speed up, and attain a desired towline velocity. Once the target approaches within a predetermined distance of the reeling machine housing, the towline velocity is slowed so that the target is returned at a safe speed. When the target is docked with the reeling machine, it engages an In/Lock switch to indicate safe docking. At this time the controller engages the brake, closes and locks the vent doors, and monitors the door position sensors to confirm that the doors are closed.

The controller monitors vent door positions to ensure that the doors are closed and locked at all times other than during a reel-in or reel-out operation. In a preferred embodiment, the controller generates an alarm signal which is transmitted over an interface unit to alert the pilot of a towing aircraft whenever the vent doors have failed to close as the controller continues to attempt to close the doors.

The control arrangement and reeling machine of the present invention eliminate pilot errors. In the event of failure of one or more of the sensors, the controller will terminate a normal deployment or reeling-in operation and execute a "SLOW" default mode wherein the towline is reeled-in at a safe speed. Alternatively, during a catastrophic failure, the controller could terminate reeling operation and simply close and lock the vent doors.

In a preferred embodiment, the controller comprises a microcontroller which performs all calculations and logic functions. The microcontroller interprets all sensor data and responds by appropriate interrupt routines to any detected fault condition. Also, in a preferred embodiment, a tachometer is provided as a backup sensor to monitor turbine speed. An overspeed detection device also is provided which receives signals from the tachometer and provides an overspeed signal to the door controller in the event of turbine overspeed.

Briefly, a digital control device, in accordance with the present invention for an aircraft tow reel machine includes position sensor means for sensing that position of the vent doors and velocity sensor means for sensing an instantaneous velocity of the towline. Memory means are provided for storing desired towline velocity data. A velocity comparator compares instantaneous towline velocity data from the velocity sensor means with desired towline velocity data from the memory means to generate a velocity difference signal. A door control means responds to the difference signal and a position signal from the door position sensor means to generate a vent door driving signal which it applies to a vent door driving means for positioning of the vent doors.

According to the invention, there is a provided a digitally-controlled reeling machine for deploying and reeling-in a towline which machine comprises:

a housing mountable on an aircraft, the housing having an air inlet and vents therein, an air-driven turbine disposed within the housing, a reel means, a turbine output shaft connecting the turbine rotor to the reel means, vent doors movable to open and close the vents, a door position sensor for sensing the position of the vent doors, a towline velocity sensor for sensing the instantaneous towline velocity, a memory for storing desired towline velocity data, a velocity comparator means for comparing instantaneous towline velocity data provided by a towline velocity signal from the towline velocity sensor with desired towline velocity data from the memory, and generating a different signal based upon the different thereof, door control means responsive to a difference signal generated by the velocity comparator means and a position signal from the position sensor means for generating a vent door driving signal, and vent door driving means for controlling vent door position according to vent door driving signals from the driving signal generating means.

In another aspect, the invention provides a method for controlling an aircraft tow reel machine of the above description which method comprises the steps of:

comparing an instantaneous towline velocity value provided by a towline velocity signal from the machine's velocity sensor means with a stored desired towline velocity value;

generating a desired door position signal dependent upon a difference between the instantaneous towline velocity value and the desired towline velocity value;

comparing the desired door position signal with a signal indicative of the actual door position form the machine's position sensor means;

generating a vent door driving signal dependent upon a difference between the desired door position signal and the actual door position signal; and applying the vent door driving signal to the machine's vent door driving means to control the vent doors and thereby regulate the desired open, partially opened or closed state of the doors.

BRIEF DESCRIPTION OF THE DRAWINGS

Further aspects and features of the present invention will be even more apparent from the following detailed description and drawings, and the appended claims. In the drawings:

FIG. 3B is a graphical representation, similar to FIG. 3A, which shows the velocity profile for reeling-in;

DESCRIPTION OF THE PREFERRED EMBODIMENTS

Figure 1:
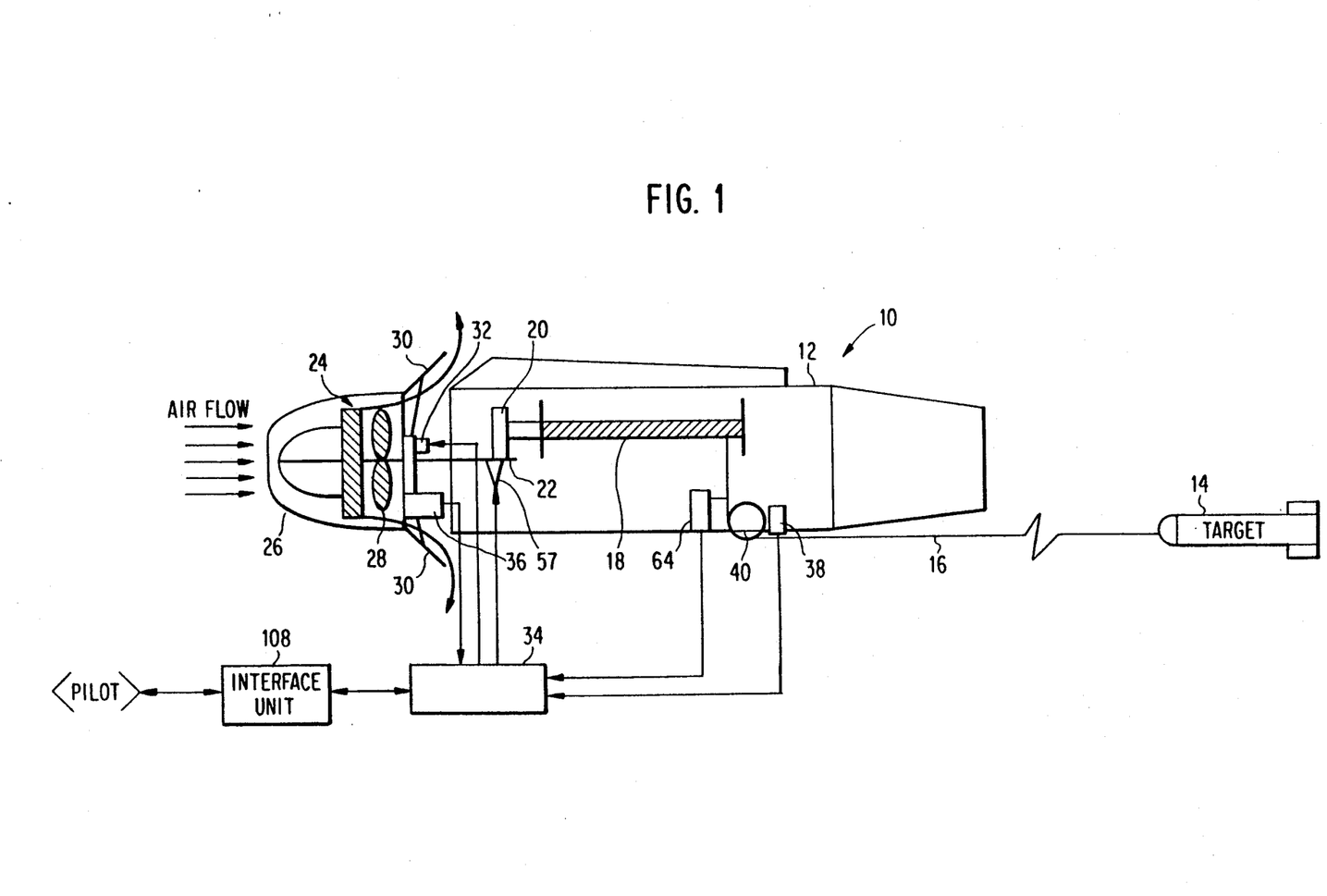
FIG. 1 depicts a digitally-controlled, turbine tow reel machine according to the present invention in partial block-diagrammatic form.

FIG. 1 shows a digitally controlled aircraft tow reel machine 10 according to the preferred embodiments of the present invention. Generally, reeling machine 10 comprises a housing 12 which is adapted to be mounted to the underside of a conventional aircraft. Depending upon the type of aircraft, the reeling machine 10 can be installed on either the fuselage or a wing of the aircraft. Reeling machine 10 is shown with a tow target 14 which depends from the machine by a towline 16. Target 14 is only a general representation and the actual target could be any of various conventional aerial tow targets.

To pay in or pay out the towline 16, machine 10 includes a reel 18 upon which the towline is wound. A transmission mechanism 20 drivingly connects reel 18 to the rotor shaft 22 of a turbine assembly 24. Preferably, transmission 20 provides a six-to-one reduction gear ratio between the rotor shaft 22 and reel 18. Torque is applied to rotate shaft 22 as air flows through an inlet 26 in housing 12 to drive turbine rotor 28. Vent doors 30 are located downstream of the rotor 28 in housing 12 to provide air flow through the housing. Vent doors 30 regulate the flow of ram air for driving rotor 28 in order to control the rotational speed of the rotor and thus the rotor shaft 22. Vent doors 30 in turn are regulated by a vent door driving mechanism 32 which is provided to move the doors to any position from a completely closed to a fully open position.

Figure 2:
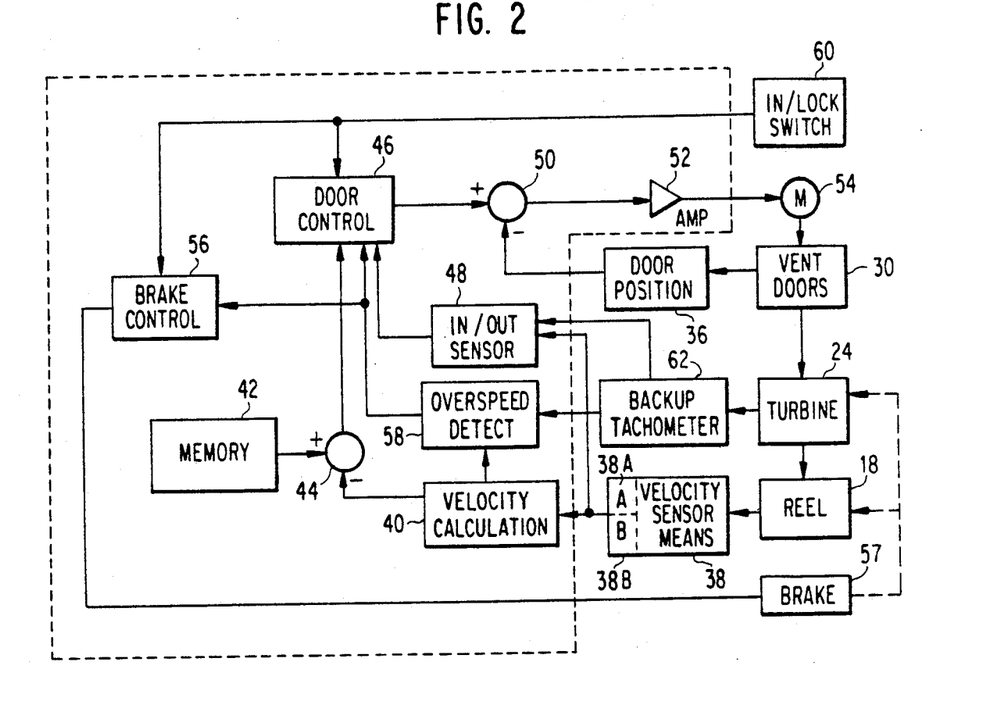
FIG. 2 is a functional block diagram of the reeling-machine shown in FIG. 1.

With reference to both FIG. 1 and the functional block diagram in FIG. 2, an automatic control module 34 provides instructions to driving mechanism 32 to control the deployment and reel-in of the target 14. In the preferred embodiment, control module 34 is implemented digitally, however, it is contemplated that the control module could comprise analog elements. Automatic control module 34 receives data indicative of the position of the vent doors 30 from a door position sensing device 36. Control module 34 also receives digital signals from a digital velocity sensor means 38 to provide the module with the instantaneous velocity of the towline as it passes the sensor means over the pulley 40. In the preferred embodiments, sensor means 38 actually comprises two velocity sensors 38A and 38B, shown in FIG. 2, which are spaced apart along cable 16 (not shown in FIG. 1). Each sensor 38A and 38B generates an instantaneous towline velocity signal.

Control module 34 includes a velocity calculator 40 connected to receive towline velocity signals from sensor means 38. Based upon the towline velocity signals, calculator 40 measures the instantaneous towline velocity and calculates the length of towline paid-out. An internal memory 42 stores velocity profiles which give the desired velocity for the towline 16 at all times during both deployment of the target 14 and reel-in of the towline to terminate a target practice mission. Desired velocity data from memory 42 and instantaneous velocity values from calculator 40 are compared at a comparator 44 to determine the difference between the measured and desired towline velocities. Comparator 44 provides the difference value as a difference error signal to a vent door control element 46 together with the length of outstanding towline.

A direction sensing device, namely In/Out sensor 48, also monitors the towline velocity signals from sensors 38A and 38B. In/Out sensor 48 determines the direction of movement of the towline 16 and accordingly applies a reeling direction signal to the control unit 46 to indicate whether the towline 16 is being paid-out or paid-in.

Based upon the signals received from comparator 44, and the direction signal received from sensor 48, control unit 46 generates a desired vent door position signal which it applies as the positive input to a second subtracter 50. A signal indicating the actual vent door position is applied as a negative input to the subtracter 50. Subtracter 50 likewise compares the desired door position signal output by control unit 46 and the actual door position signal to generate an error or driving signal for adjusting the position of the vent doors 30 so as to minimize the magnitude of the error signal. The door driving signal generated by subtracter 50 is amplified by an amplifier 52 and then applied to drive a servo motor 54 embodying driving mechanism 32, in order to open or close the vent doors 30 to a desired extent. Automatic control module 34 thus regulates the towline velocity during the reeling operation to control the turbine 24 to seek and change speed in response to towline velocity.

Control module 34 according to the present invention also comprises a brake control unit 56 for controlling operation of a turbine brake 57. Brake control unit 56 is connected to an overspeed detector 58. Overspeed detector 58 monitors the towline velocity from calculator 40 for a turbine overspeed condition. If detector 58 determines that the towline velocity exceeds a predetermined limit, the detector applies an overspeed signal to both brake control element 56 and door control element 46. In response to the overspeed signal from detector 58, brake control unit 56 causes the turbine brake 57 to stop rotation of the turbine 24 and thus the reel 18 in order to protect these elements from damage caused as a result of turbine overspeed conditions. At the same time, door control unit 46 responds by generating an output having sufficient magnitude to cause immediate closure of the vent doors 30. Thus when overspeed conditions are sensed, the vent doors 30 automatically are shut and the reeling operation is halted.

From FIG. 2, it is also seen that an In/Lock indicator 60 is provided for informing the control module 34 that all of the towline 16 is reeled-in and that the target 14 is in a stowed-away position within the housing 12. Indicator 60 could comprise a switch (not shown) or any other suitable device in the housing 12 for signalling return of the tow target to the housing. Indicator 60 furnishes the in/lock signal to both the door control unit 46 and the brake controller 56 which respectively close and lock the vent doors 30 and apply the brake 57 to lock the turbine 24 and the reel 18. It is contemplated that when vent doors 30 are closed and locked, the servo driving mechanism 32, including motor 54, will be placed in a standby mode with no active signal applied to the driving mechanism. This reduces the possibility that electromagnetic noise could cause the vent doors 30 to unauthorizedly open in response to a noise received by driving mechanism 32.

Figure 3A:
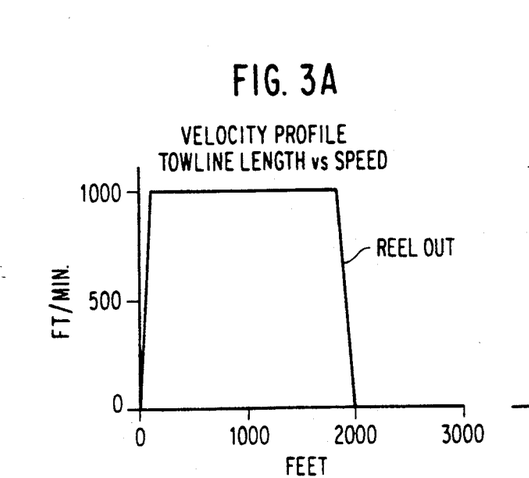
FIG. 3A is a graphical representation of the velocity profile for controlling towline velocity during deployment or reeling-out.
Figure 3B:
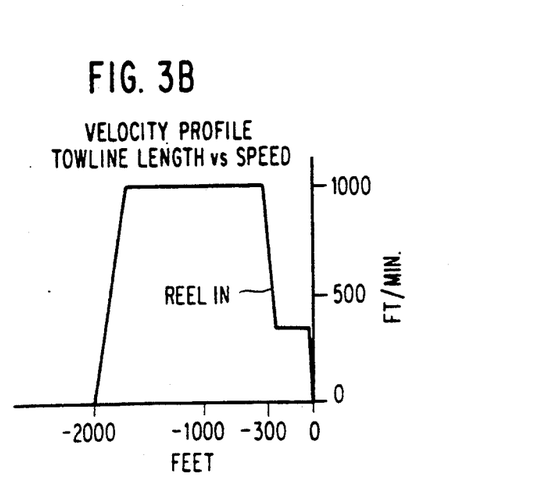

FIGS. 3A and 3B graphically show preferred velocity profiles for automatic controller 35. In both FIGS. 3A and 3B the length of outstanding towline is plotted against towline speed in feet per minute. FIG. 3A gives the velocity profile for deployment or reel-out of the tow target 14. After the vent doors 30 are unlocked and opened, the turbine brake 57 is released to allow wind resistance to begin deployment of the target 14. Automatic controller 34 permits the towline velocity to increase rapidly according to the rather sharp ramp upward until approximately the first 50 feet of towline are paid out. Once the towline velocity reaches approximately 1,000 feet/minute, controller 34 adjusts the vent doors to regulate air flow through the turbine 24 so that the turbine applies a braking force to the reel 18. This braking force serves to maintain the pay out velocity constant at about 1,000 feet per minute until approximately 1,900 feet of towline are paid out. As the target 14 approaches the desired deployment length of 2,000 feet, controller 34 adjusts the vent doors 30 to open further and increase turbine braking to ramp down the towline velocity as indicated in FIG. 3A until the target 14 is deployed at 2000 feet. The graph of the towline velocity during reel-out as shown in FIG. 3A generally can be described by the continuous function:

$$v = \begin{cases} 20x \text{ for } 0 \leq x \leq 50, \\ 1{,}000 \text{ for } 50 < x \leq 1{,}900, \text{ and} \\ -10x + 20{,}000 \text{ for } 1{,}900 < x \leq 2{,}000 \end{cases}$$

where v is towline velocity and x is the length of deployed towline.

With regard to FIG. 3B, when controller 34 is commanded to reel-in the target 14, the controller first opens the vent doors 30 to prevent the target from being pulled further outwardly by air drag when the brake 57 is first released. The tendency of target 14 to be pulled rearwardly by wind resistance is countered by the braking action of the turbine 24. Controller 34 continues to open the vent doors 30 to provide turbine power for reeling-in the towline 16. The towline velocity ramps upward rather steeply at the beginning of pay-in until, at a point where approximately 1,900 feet of towline are still outstanding, controller 34 adjusts the vent doors to again maintain the towline velocity at approximately 1,000 feet per minute until only about 350 feet of towline remain outstanding. At the 350 foot point, controller 34 readjusts the vent doors 30 to decrease turbine torque to slow the towline velocity until at about where 300 feet of towline are outstanding, the towline velocity is maintained at approximately 400 feet per second whereafter reel-in continues until the target is brought in to its stowed position. Reel-in at approximately 400 feet per second is referred to as operation in the "SLOW" mode. Control according to the curve in FIG. 3B generally is given by the following:

$$v = \begin{cases} 10x + 20{,}000 \text{ for } -2{,}000 \leq x < -1{,}900 \\ 1{,}000 \text{ for } -1{,}900 \leq x < -350 \\ -12x - 3{,}200 \text{ for } -350 \leq x < -300 \\ 400 \text{ for } -300 \leq x \leq 0. \end{cases}$$

Control according to the reel-in and reel-out profiles with the smooth ramp up and the smooth ramp down in towline speed reduces wear on the brake 47, and further, reduces shock and vibration in the entire reeling machine 10.

Figure 4:
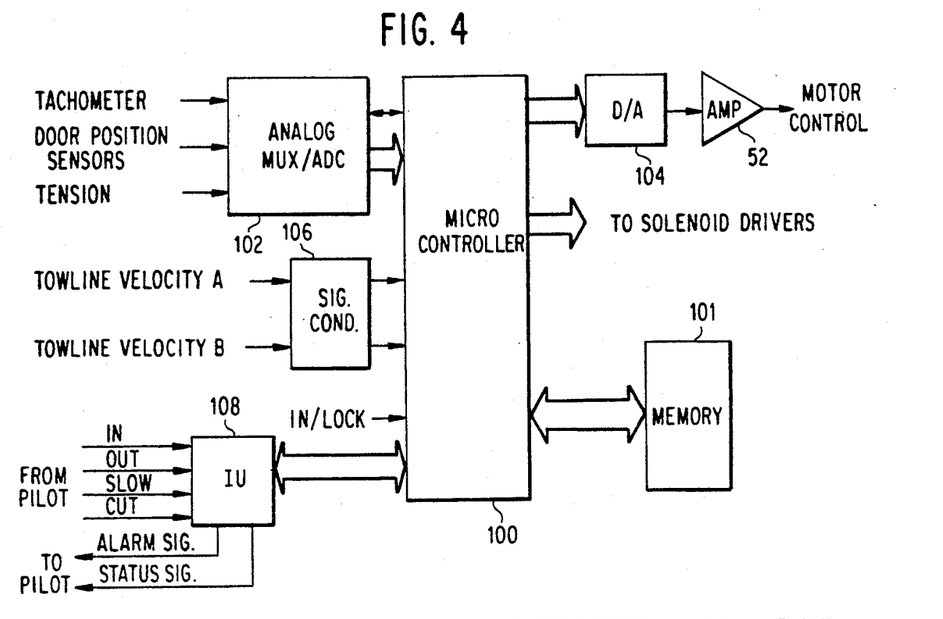
FIG. 4 is a block diagram showing a preferred arrangement of hardware for implementing the control elements of a reeling machine in accordance with the present invention.
Figure 5:
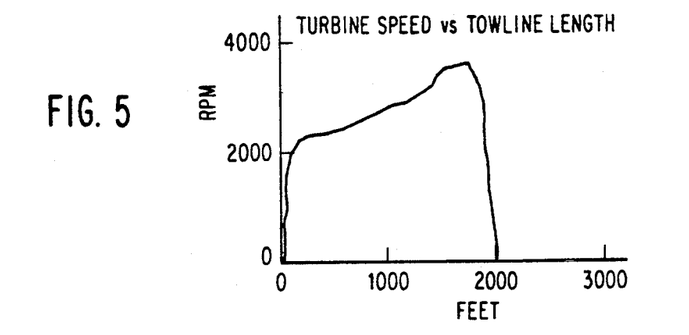
FIG. 5 is a graphical representation of turbine rotational speed versus outstanding towline length.

FIG. 4 is a block diagram in partial schematic form which shows a preferred arrangement of hardware for implementing a reeling machine control system in accordance with the present invention. Digital microcontroller 100 is capable of performing all calculations and logic functions discussed in connection with the automatic control module 34 of FIG. 2. A memory 101 provides the desired velocity profiles to microcontroller 100. It is understood that memory 101 could be internal to the microcontroller 100. In FIG. 4, microcontroller 100 also is shown with a combined analog multiplexor and analog-to-digital converter circuit 102 which converts the analog signal from door position sensor 36 to a digital form for the microcontroller.

The vent door driving signal generated by microcontroller 100 is applied to a digital-to-analog converter 104 which converts the driving signal to an analog form suitable for motor 54. A signal condition circuit 106 is provided to condition the measured velocity signals from velocity sensors 38A and 38B.

An interface unit (IU) 108 permits direct control by the operator over the reeling operations regulated by microcontroller 100. By means of a cockpit switch or the like (not shown) which is connected to interface unit 108, the pilot applies the commands, "Out" and "In" to instruct microcontroller to execute a target deployment, i.e. a reeling-out, or a reeling-in operation. A "SLOW" command can be given via IU 108 to instruct microcontroller 100 to reel-in the towline 16 at a reduced speed such is 400 feet/minute in the preferred embodiments.

According to the preferred embodiments, microcontroller 100 also is programmed to automatically reel-in towline 16 in the SLOW mode in the event of failure of either of towline velocity sensors 38A or 38B. If a sensor 38A or 38B fails during a reel-in operation, microcontroller 100 simply defaults to the "SLOW" mode to complete the reel-in. If the failure is during deployment, deployment is terminated and the towline is reeled-in in the SLOW mode.

Although optional, it is preferred to provide a tachometer 62 as a back-up for overspeed detection and direction sensing. As indicated in FIG. 2, tachometer 62 directly measures turbine speed at turbine 24. Tachometer 62 provides tachometer signals as illustrated in FIG. 2 to both overspeed detector 58 and In/Out sensor 48. In FIG. 4, the signal from tachometer 62 is shown as applied to multiplexor/converter 102. Thus, if either or both of velocity sensors 38A or 38B fail, microcontroller can regulate "SLOW" mode reel-in operation based upon the signals from tachometer 62. During this default procedure, microcontroller 100 monitors direction sensor 50 and overspeed detector 48 which receive turbine speed signals from tachometer 62 to ensure that the target 14 is reeled in at a speed well below overspeed conditions. If the tachometer also were to fail, microcontroller would terminate all reeling operations and close and lock the vent doors 30.

With reference to FIGS. 1 and 4, preferred reeling machine 10 also could comprise a towline tension sensor 64 which is shown as a functional block in FIG. 1. Sensor 64 likewise provides a signal to microcontroller 100 by means of multiplexor/converter 102. The tension signal provides a further communication of the operating conditions of machine 10. If, for example, due to very high wind speed conditions, tension on the towline 16 becomes excessive, microcontroller 100 can so apprise the pilot via IU 108 and either await a command from the pilot through the IU or automatically compensate by a desired default routine.

Also as indicated in FIG. 4, IU 108 can be made to transmit a "CUT" command from the pilot to microcontroller 100. In response to the "CUT" command, microcontroller 100 drives a solenoid-operated conventional cutting device (not shown) for severing the tow cable 16 to release the target 14. As is understood, the "CUT" command usually is reserved for a catastrophic situation, such as where both velocity sensors 38A and 38B and the tachometer 62 fail so that no towline speed information is available. Further, if desired, microcontroller 100 can be made to respond to a "JETTISON" command which instructs release of the target 14 from the end of the towline 16.

Interface unit 108 also monitors the status of reeling operations from data received from the microcontroller 100 and transmits status information to the pilot. In the preferred embodiment, when the tow target 14 is docked upon termination of a mission, and the IN/-LOCK switch 60 is activated to indicate that the target is in its stowed position, microcontroller 100 causes engagement of the turbine brake 57 and thereafter monitors the door position sensor 36 to confirm that the doors 30 are closed and locked. Microcontroller 100 then provides a status signal indicating such to the pilot by means of the interface unit 108. If it is indicated that the vent doors 30 failed to close properly, microcontroller 100 executes a command for closing the vent doors 30 and simultaneously causes interface unit 108 to provide a signal informing the pilot that the vent doors failed to close and/or lock. As is evident, interface unit 108 could be made to inform the operator of various other conditions as well, for example, the interface unit could indicate that the microcontroller 100 is operating in the "SLOW" mode. Further, if reeling machine 10 comprises any pneumatic equipment, microcontroller 100 can be made responsive to signals indicative of insufficient air pressure and to act accordingly.

Similarly, other outputs from microcontroller 100 can be supplied to convertor circuits before being applied to solenoid drivers or the like which commonly make up a part of mechanisms such as the brake 47 and a latch mechanism (not shown) for locking the vent doors 30 closed.

Figure 6A:
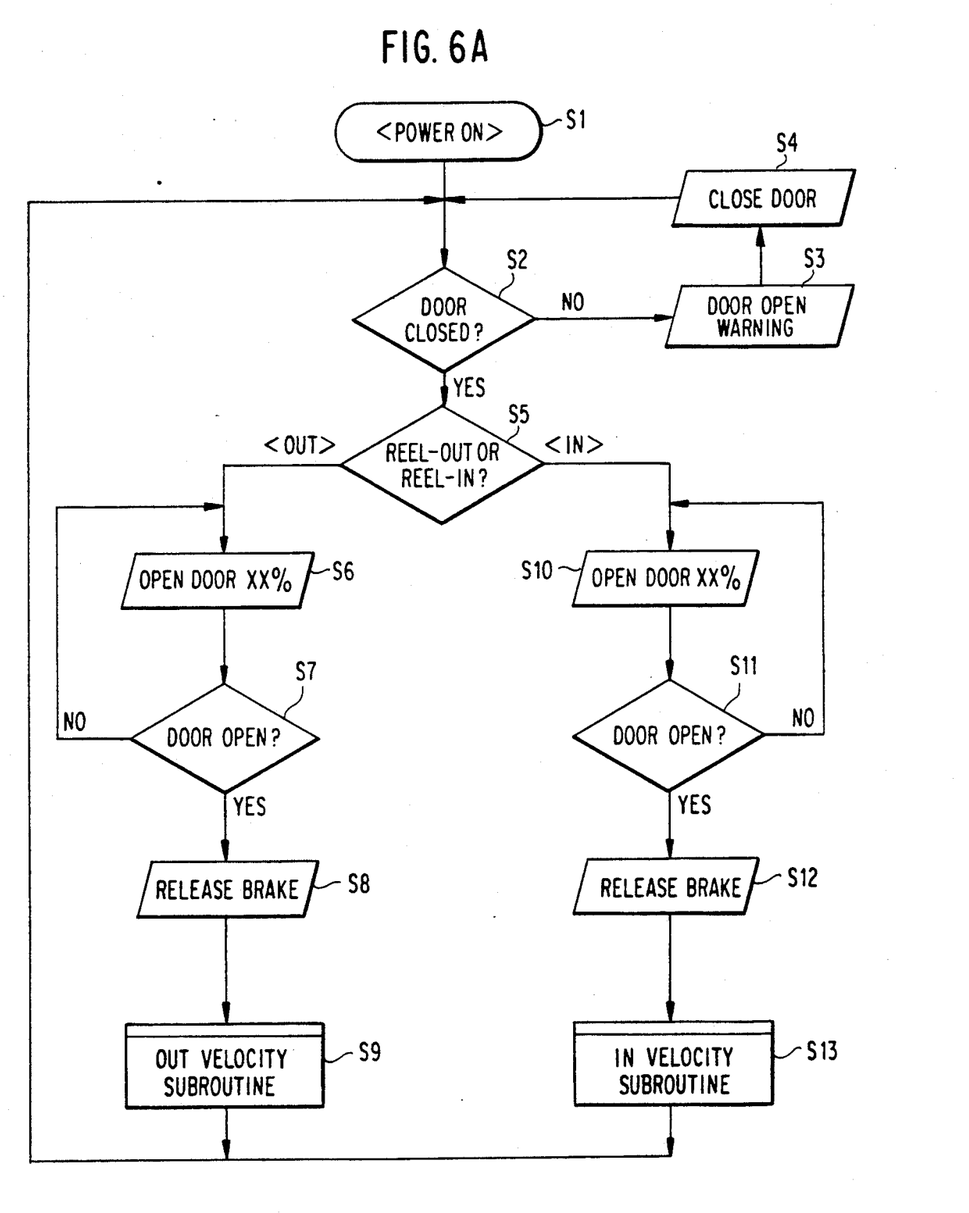
FIG. 6A is a flow diagram useful in understanding an initialization routine in the operation of the reeling machine controller and reeling machine according to the present invention.

Operation of the reeling machine 10 according to the present invention will be described with reference to the flow diagrams in FIGS. 6A through 6C and the embodiment of FIG. 4. FIG. 6A shows an initiation routine beginning with applying power to microcontroller 100 at step S1. At step S2, microcontroller 100 interrogates the door position sensors 36 to ensure that the vent doors 30 are closed. According to the decision in step S2, if the doors are open, at step S3, microcontroller 100 causes the interface unit 108 to provide a door open alarm to alert the pilot of the condition of the vent doors. Thereafter, in step S4, microcontroller 100 drives the motor 54 to close the vent doors 30. In this way microcontroller 100 monitors the vent door position to ensure that the doors 30 are closed at all times except during deployment and reel-in of the tow target 14. Even if the pilot had inadvertently left the vent doors open, microcontroller 100 would automatically correct the situation and apprise the pilot by way of interface unit 108.

When microcontroller 100 determines that the vent doors are closed, advance is made to step S5 wherein the decision is made by the operator whether to deploy or reel-in the towline. If the decision is to deploy the target 14, microcontroller 100 begins to drive motor 54 to open the vent doors 30 to a predetermined setting in step S6. Thereafter, microcontroller 100 continues to interrogate door position sensors 36 by repeating steps S6 and S7 until the vent doors 30 have opened to the desired extent. Once the doors are opened sufficiently, in step S8, the turbine brake 57 is released so that the towline will be paid-out to deploy target 14 by air drag on the target 14. To the control deployment of the target 14 according to the curve in FIG. 3A, the vent doors 30 are opened in step 6 before release of the brake 57 to provide for turbine braking of the reel 18.

Figure 6B:
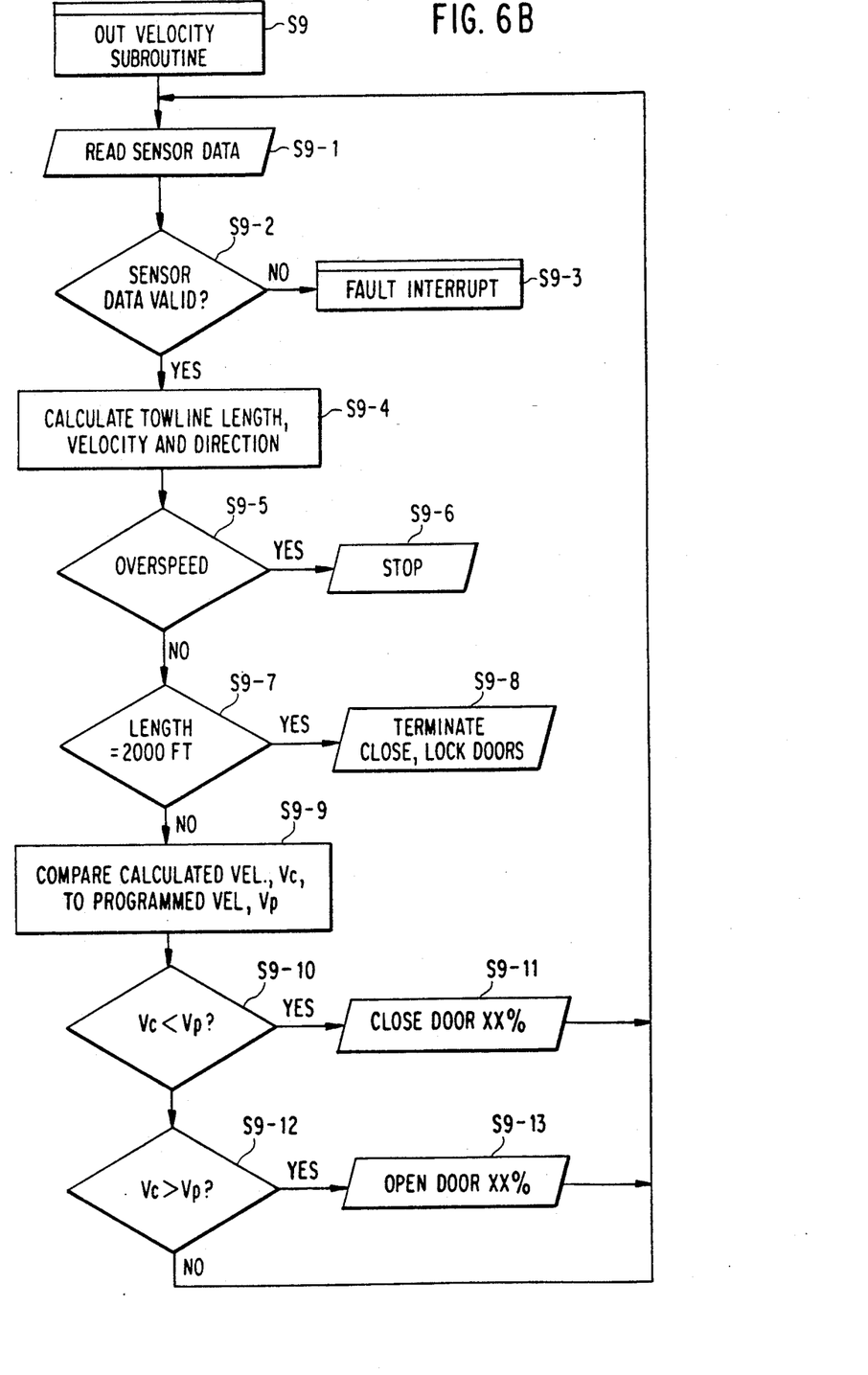
FIG. 6B is a flowchart, similar to FIG. 6A, useful in understanding a reeling-out operation.

After the brake 57 has been released in step S8, advance is made to the reel-out velocity control subroutine indicated as step S9 in FIG. 5A and shown in detail in FIG. 6B. The reel-out velocity control subroutine comprises the step S9-1 wherein microcontroller 100 reads all input sensor data. In step S9-2, it is decided whether data are received from each of the sensors 36, 38A, 38B, 64 and the tachometer 62 and whether such data are valid. If, in step S9-2, microcontroller 100 determines that sensor data is absent or invalid, an appropriate fault interrupt routine is executed in step S9-3. As described previously, the fault interrupt routine could comprise terminating target deployment and reeling-in the towline 16 in the "SLOW" mode while microcontroller 100 monitors backup turbine speed according to a turbine speed signal from tachometer 62.

Under normal conditions, the towline is deployed while its velocity and outstanding length are monitored in steps S9-4. Throughout deployment, step S9-5 is repeated to compare the calculated towline velocity with an overspeed velocity. If an overspeed condition is detected, microcontroller 100 terminates deployment in step S9-6. In the absence of an overspeed condition, in step S9-7, microcontroller 100 monitors whether 2,000 feet of towline have been deployed. If so, advance is made to step S9-8, deployment is terminated and the vent doors 30 are closed and locked. If the deployed towline length is less than 2,000 feet, microcontroller 100 continues to compare the instantaneous towline velocity to the velocity given by the velocity profile for deployment in step S9-9.

Step S9-10 is a decisional step wherein the measured towline velocity is compared with the appropriate profile velocity. If the measured velocity is below the profile velocity, in step S9-11, the vent doors 30 are closed to an extent that the deployment velocity increases to the desired velocity. Alternatively, if it is determined that the measured deployment velocity exceeds the programmed velocity value in step S9-12, the vent doors 30 are opened further to increase turbine braking in step S9-13. In the absence of a sensor failure or an overspeed condition, steps S9-10 through S9-13 are repeated, as necessary, until the deployed towline length reaches 2,000 feet. When the target 14 is fully deployed, the vent doors 30 are closed and locked and the turbine brake 57 is applied. Thereafter, microcontroller 100 can be deactivated by the pilot.

When it is time to terminate the mission and reel-in the target 14, microcontroller 100 is activated by the pilot and again automatically checks that the vent doors 30 are closed. In step S5, the decision is made to execute the reel-in routine. The vent doors are opened to provide for turbine braking and automatic reel-in in step S10 and in step S11 it is confirmed that the doors have opened properly. Turbine braking thus prevents the target 14 from moving further in the deployment direction when the brake is released in step S12. Once the brake is released in step S12, reeling-in automatically commences.

Figure 6C:
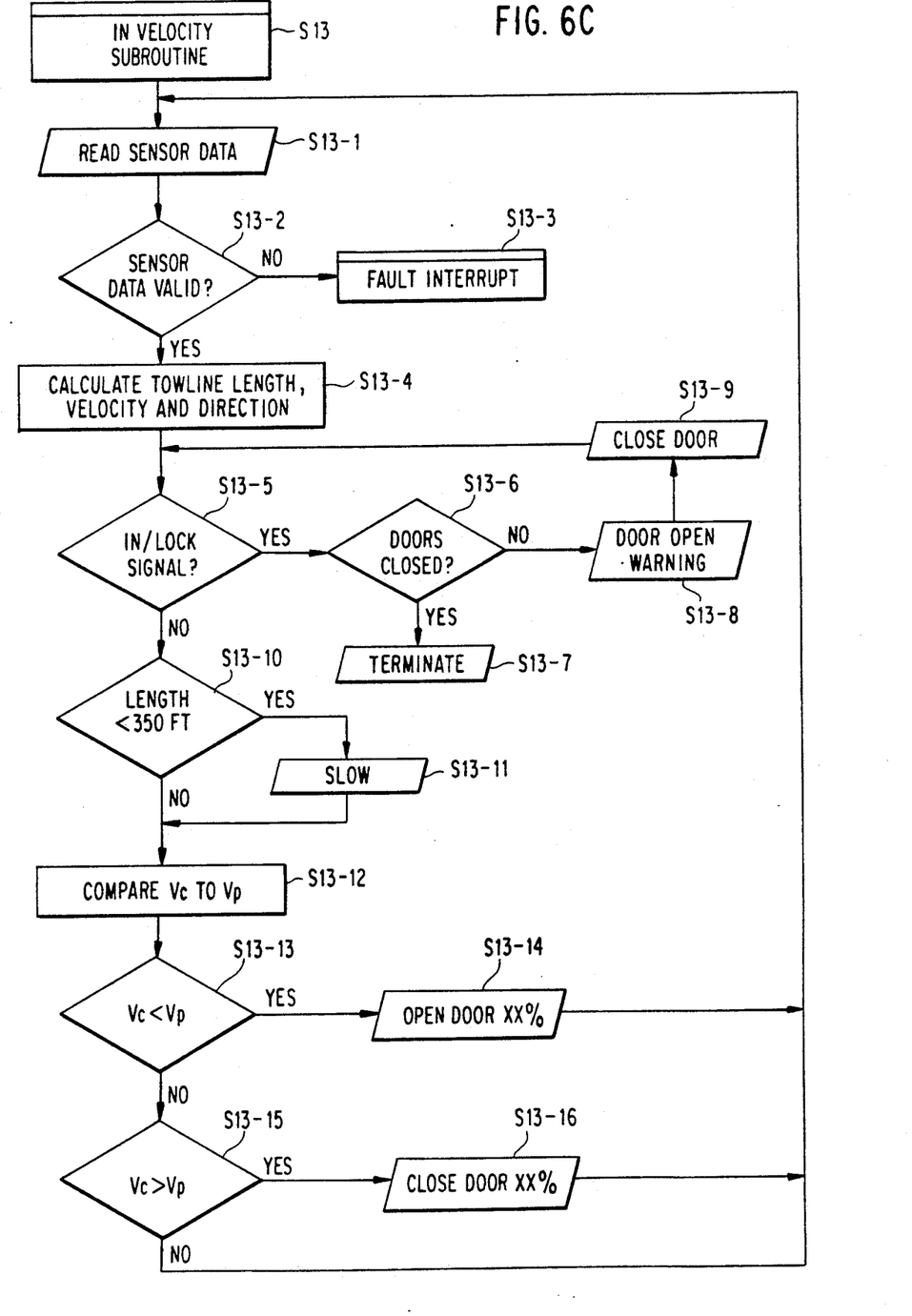
FIG. 6C is a flowchart, similar to FIG. 6B, useful in understanding a reeling-in operation.

Reel-in velocity subroutine S13 is shown in detail in FIG. 6C. During reel-in, in step S13-1, all sensor data is read. If, in step S13-2, it is determined that any sensor data are invalid, an appropriate fault interrupt sequence is executed in step S13-3. If the sensor data is valid, the length of deployed towline and the pay-in towline velocity are calculated in step S13-4. In this step it is also confirmed that the towline is moving in the right direction, that is being paid-in. In step S13-5, microcontroller 100 checks for the in/lock signal. If, in decisional step 13-6, the presence of the in/lock signal has been confirmed and the vent doors 30 are closed and locked, reel-in terminates in step 13-7. If it is determined that the vent doors 30 are not closed in step S13-6, a door open warning signal is provided to the pilot in step S13-8, and in step 813-9, a close door command is given.

In the absence of the in/lock signal in step S13-5, microcontroller 100 next evaluates whether the outstanding towline length is less than 350 feet in step S13-10. If the outstanding length is less than 350 feet, microcontroller 100 slows the towline speed in step S13-11 to approximately 400 feet/minute to avoid a high velocity impact of the tow target 14 with the housing 12. If the outstanding towline length exceeds 350 feet, in step S13-12, the measured towline velocity is compared with the reel-in velocity given by the velocity profile in FIG. 3B. In steps S13-13, S13-14, S13-15 and S13-16, the positions of the vent doors 30 are adjusted to control the reel-in velocity according to the appropriate profile velocity. When the target 14 is completely reeled-in, the In/Lock switch 60 is activated to indicate that the target 14 is in its stowed position. Thereafter, microcontroller 100 completely closes and locks the vent doors 30. Closure of the doors is confirmed and the turbine brake 57 is applied.

Figure 7:
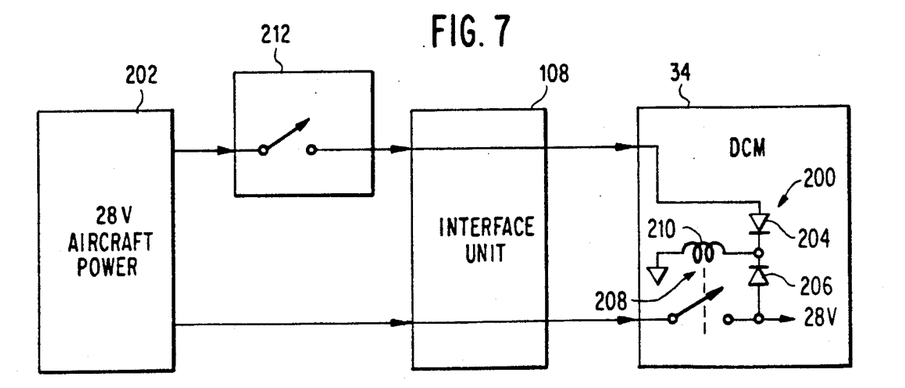
FIG. 7 shows an emergency power circuit suitable for use with the controller and reeling machine of the present invention.

In the preferred embodiments, controller 34 has an emergency power circuit 200 as shown in FIG. 7 to apply emergency power for forcing the vent doors closed. If the controller 34 undergoes a power loss, circuit 200 provides power to the controller directly from the 28 volt aircraft power supply 202 to enable controller 34 to automatically check whether the doors 30 are closed and locked, and to drive the servo motor 54 if the doors are not locked. The controller 34 will apply power obtained from supply 202 and preferably give an appropriate indication to the pilot. Thus, when the control system in accordance with the invention is powered down by the pilot, or even by component failure, the controller is still provided with power to verify that the vent doors 30 are closed and locked before the vent door driving elements are deactivated.

Power circuit 200 is seen to include diodes 204 and 206 and a solenoid 208 with its coil 210 connected between the diodes and ground. A pilot control switch 212 is provided to energize the solenoid 208 to complete a circuit from the aircraft power supply 202, through interface unit 108, to the door drive motor 54.

It is to be understood that there can be various changes and modifications to the preferred embodiments of the system of the present invention as disclosed herein, which changes and/or modifications may be made by one of ordinary skill in the art. However, such changes or modifications would still result in a system well within the scope of the invention as set forth in the claims.

We claim:

1. A control device for an aircraft tow reel machine including an air driven turbine, vent means having vent doors to regulate air flow through the turbine, and reel means including a towline, said control device comprising:

position sensor means for sensing the position of the vent doors and providing a position signal indicative thereof;

velocity sensor means for sensing an instantaneous velocity of the towline and providing a towline velocity signal indicative thereof;

memory means for storing desired towline velocity data;

velocity comparator means for comparing instantaneous towline velocity data provided by a towline velocity signal from said velocity sensor means with desired towline velocity data from said memory means and generating a difference signal based upon the difference thereof;

door control means responsive to said difference signal generated by said comparator means and said position signal from said position sensor means for generating a vent door driving signal; and vent door driving means for controlling the position of the vent doors according to a vent door driving signal from said door control means.

2. A control device as claimed in claim 1, wherein said door control means comprises calculating means for calculating said desired door position signal based upon said difference signal from said velocity comparator means, and a position comparator means for comparing said desired door position signal with a vent door position signal from said position sensor means to generate a vent door driving signal.

3. A control device as claimed in claim 2, wherein said velocity sensor means comprises two velocity sensors, each of said sensors providing a towline velocity signal.

4. A control device as claimed in claim 3, further comprising a towline direction sensing device which receives towline velocity signals from each of said velocity sensors, determines the direction of movement of the towline therefrom, and provides towline direction signals to said door control means.

5. A control device as claimed in claim 4, further comprising turbine overspeed detection means for providing a turbine overspeed signal to said door control means when said towline velocity signal exceeds a predetermined value whereby said door control causes said door driving means to close the vent doors.

6. A control device as claimed in claim 5, further comprising a tachometer for applying signals indicative of turbine rotor rotation to said direction sensing device and said overspeed detection means.

7. A control device as claimed in claim 5, comprising brake control means responsive to the condition of an in/lock switch which is operated to indicate that a tow target attached to the towline is in a stowed position, and to an overspeed signal from said overspeed detection means to operate a turbine brake.

8. A control device as claimed in claim 7, wherein said memory means, said velocity comparator means, said door control means, and said brake control means comprise digital means.

9. A control device as claimed in claim 7, wherein said memory means, said velocity comparator means, said door control means, and said brake control means are provided by a microprocessor.

10. A control device as claimed in claim 5, further comprising a tension sensor for detecting tension in the towline and providing a tension signal indicative thereof to said door control means.

11. A control device as claimed in claim 1, wherein said desired velocity data stored by said memory means is in the form of a velocity profile.

12. A control device as claimed in claim 11, wherein said profile for reel-out is given by the equations:

$$v(\text{Ft./Min.}) = \begin{cases} ax \text{ for } 0 \leq x \leq 50 \\ 1{,}000 \text{ for } 50 < x \leq 1{,}900 \\ -bx + 20{,}000 \text{ for } 1{,}900 < x \leq 2{,}000, \end{cases}$$

and said profile for reel-in is given by $$v(\text{Ft./Min.}) = \begin{cases} cx + 20{,}000 \text{ for } -2{,}000 \leq x < -1{,}900 \\ 1{,}000 \text{ for } -1{,}900 \leq x < -350 \\ -dx - 3{,}200 \text{ for } -350 \leq x < -300 \\ 400 \text{ for } -300 \leq x \leq 0 \end{cases}$$

where v is towline velocity, x is the length of outstanding towline and a, b, c and d are constants.

13. A control module for an aircraft tow reel machine including an air driven turbine, vent means having vent doors to regulate air flow through the turbine, and reel means including a towline, position sensor means for sensing the position of the vent doors and providing a position signal indicative thereof, velocity sensor means for sensing an instantaneous velocity of the towline and providing a towline velocity signal indicative thereof, and vent door driving means, responsive to a vent door driving signal, for controlling the position of the vent doors, said control module comprising:

processor means including first means for comparing instantaneous towline velocity data provided by a towline velocity signal from the velocity sensor means with stored desired towline velocity data and calculating a difference value therebetween, second means for determining a desired vent door value based upon said difference value, and third means for generating a vent door driving signal based upon a difference between said desired vent door value and the vent door position as indicated by a position signal from the door position sensor means;

first interface means for transmitting signals from the position sensor means and the velocity sensor means to said processor means; and second interface means for applying generated vent door driving signals to the vent door driving means.

14. A control module as claimed in claim 13, wherein the velocity sensor means comprises two velocity sensors, said processor means further comprising towline direction sensing means for determining the direction of towline movement based upon towline velocity signals from each of the velocity sensors.

15. A control module as claimed in claim 14, further comprising overspeed detection means for causing said third means to generate a vent door driving signal to cause the vent doors to close.

16. A control module as claimed in claim 15, wherein the tow reel machine further comprises a tachometer for applying signals indicative of turbine rotation to said overspeed detection means.

17. A control module as claimed in claim 13, further comprising an operator interface unit for interfacing said module with an operator.

18. A control module as claimed in claim 13, wherein said module comprises a microprocessor.

19. A control module as claimed in claim 18, wherein upon failure of any of said sensor means, said microprocessor causes the towline to be reeled in at a predetermined towline velocity.

20. A control module as claimed in claim 18, wherein said microprocessor causes the vent doors to close and lock at all times other than when the towline is being reeled-out or reeled-in.

21. A control module as claimed in claim 20, further comprising emergency power supplying means for providing emergency power to the vent door driving means from an aircraft power source.

22. A module device as claimed in claim 13, wherein said stored desired velocity data is in the form of a velocity profile.

23. A control module as claimed in claim 22, wherein said profile for reel-out is given by the equations:

$$v(\text{Ft./Min.}) = \begin{cases} ax \text{ for } 0 \leq x \leq 50 \\ 1{,}000 \text{ for } 50 < x \leq 1{,}900 \\ -bx + 20{,}000 \text{ for } 1{,}900 < x \leq 2{,}000, \end{cases}$$

and said profile for reel-in is given by $$v(\text{Ft./Min.}) = \begin{cases} cx + 20{,}000 \text{ for } -2{,}000 \leq x < -1{,}900 \\ 1{,}000 \text{ for } -1{,}900 \leq x < -350 \\ -dx - 3{,}200 \text{ for } -350 \leq x < -300 \\ 400 \text{ for } -300 \leq x \leq 0 \end{cases}$$

where v is towline velocity, x is the length of outstanding towline and a, b, c and d are constants.

24. A digitally-controlled, reeling machine for deploying and reeling-in a towline, said machine comprising:

a housing adapted to be mounted to an aircraft, said housing having an air inlet in one portion and vents in another portion thereof;
an air-driven turbine disposed within said housing, said turbine having a rotor;
a reel means for winding a towline thereon;
a turbine output shaft connecting said rotor to said reel means;
vent doors movable to open and close said vents;
a door position sensor for sensing the position of said vent doors and providing a position signal indicative thereof;
a towline velocity sensor for sensing an instantaneous velocity of the towline and providing a towline velocity signal indicative thereof;
a memory for storing desired towline velocity data;
a velocity comparator means for comparing instantaneous towline velocity data provided by a towline velocity signal from said towline velocity sensor with desired towline velocity data from said memory, and generating a difference signal based upon the difference thereof;
door control means responsive to said difference signal generated by said velocity comparator means and said position signal from said position sensor means for generating a vent door driving signal; and
vent door driving means for controlling the position of said vent doors according to vent door driving signals from said driving signal generating means.

25. A reeling machine as claimed in claim 24, wherein said door control means comprises calculating means for calculating a desired door position signal based upon said velocity difference signal from said velocity comparator means, and a position comparator means for comparing said desired door position signal with a vent door position signal from said position sensor means to generate a vent door driving signal.

26. A reeling machine as claimed in claim 25, further comprising another velocity sensor, each of said velocity sensors providing a towline velocity signal.

27. A reeling machine as claimed in claim 26, further comprising a towline direction sensing device which receives towline velocity signals from each of said velocity sensors, determines the direction of movement of the towline therefrom, and provides towline direction signals to said door control means.

28. A reeling machine as claimed in claim 27, further comprising turbine overspeed detection means for providing a turbine overspeed signal to said door control means when said towline velocity signal exceeds a predetermined value, and a tachometer for applying signals indicative of turbine rotor rotation to said direction sensing device and said overspeed detection means.

29. A reeling machine as claimed in claim 28, comprising brake control means responsive to the condition of an in/lock switch which is operated to indicate that a tow target attached to the towline is in a stowed position, and to an overspeed signal from said overspeed detection means to operate a turbine brake.

30. A reeling machine as claimed in claim 29, wherein said memory means, said velocity comparator means, said door control means, and said brake control means comprise digital means.

31. A reeling machine as claimed in claim 24, further comprising emergency power supplying means for providing emergency power to said vent door driving means from an aircraft power source.

32. A reeling machine as claimed in claim 28, further comprising a tension sensor for detecting tension in the towline and providing a tension signal indicative thereof to said door control means.

33. A reeling machine as claimed in claim 24, wherein said desired velocity data stored by said memory means is in the form of a velocity profile.

34. A reeling machine as claimed in claim 33, wherein said profile for reel-out is given by the equations:

$$v(\text{Ft./Min.}) = \begin{cases} ax \text{ for } 0 \leq x \leq 50 \\ 1{,}000 \text{ for } 50 < x \leq 1{,}900 \\ -bx + 20{,}000 \text{ for } 1{,}900 < x \leq 2{,}000, \end{cases}$$

and said profile for reel-in is given by $$v(\text{Ft./Min.}) = \begin{cases} cx + 20{,}000 \text{ for } -2{,}000 \leq x < -1{,}900 \\ 1{,}000 \text{ for } -1{,}900 \leq x < -350 \\ -dx - 3{,}200 \text{ for } -350 \leq x < -300 \\ 400 \text{ for } -300 \leq x \leq 0 \end{cases}$$

where v is towline velocity, x is the length of outstanding towline and a, b, c and d are constants.

35. A method of controlling an aircraft tow reel machine having an air driven turbine, a turbine brake, vent means with vent doors to regulate air flow through the turbine, reel means including a towline, position sensor means for sensing the position of the vent doors and providing a door position signal indicative thereof, velocity sensor means for sensing the instantaneous towline velocity and providing a towline velocity signal indicative thereof, and vent door driving means for controlling the position of the vent doors, said method comprising the steps of:
comparing an instantaneous towline velocity value provided by a towline velocity signal from the machine's velocity sensor means with a desired towline velocity value;
generating a desired door position signal dependent upon a difference between said instantaneous towline velocity value and said desired towline velocity value;
comparing said desired door position signal with a signal indicative of the actual door position from the machine's position sensor means;
generating a vent door driving signal dependent upon a difference between said desired door position signal and said actual door position signal; and
applying said vent door driving signal to the machine's vent door driving means to control the vent doors.

36. A method as claimed in claim 35, further comprising the step of monitoring that the vent doors are closed and locked at all times other than during a reeling-in or reeling-out operation, and if the doors are not closed during said all other times, generating a vent door driving signal causing the machine's driving means to close and lock the doors.

37. A method as claimed in claim 36, wherein during the times the vent doors are closed and locked, no vent door driving signals are applied to the machine's vent door driving means.

38. A method as claimed in claim 35, further comprising the step of validating signals from the machine's sensor means before executing either a reeling-in or reeling-out operation.

39. A method as claimed in claim 38, wherein the machine's velocity sensor means includes two velocity sensors which each provide a towline velocity signal, said method further comprising, during a reeling-in or reeling-out operation, the steps of calculating outstanding towline length, towline velocity and towline direction based upon towline velocity data provided by velocity signals from each of the machine's tow line velocity sensors.

40. A method as claimed in claim 39, wherein said desired velocity value is provided from a stored velocity profile.

41. A method as claimed in claim 40, wherein said stored velocity profile for reel-out is given by the equations:

$$v(\text{Ft./Min.}) = \begin{cases} ax \text{ for } 0 \leq x \leq 50 \\ 1{,}000 \text{ for } 50 < x \leq 1{,}900 \\ -bx + 20{,}000 \text{ for } 1{,}900 < x \leq 2{,}000{,} \end{cases}$$

and said profile for reel-in is given by $$v(\text{Ft./Min.}) = \begin{cases} cx + 20{,}000 \text{ for } -2{,}000 \leq x < -1{,}900 \\ 1{,}000 \text{ for } -1{,}900 \leq x < -350 \\ -dx - 3{,}200 \text{ for } -350 \leq x < -300 \\ 400 \text{ for } -300 \leq x \leq 0 \end{cases}$$

42. A method as claimed in claim 40, wherein the reeling machine includes a tachometer for providing a signal representative of turbine speed, said method further comprising the step of reeling-in the towline at a rate of about 400 feet/minute based upon turbine speed signals from said tachometer in the event of failure of either of the machine's velocity sensors during a reeling-out or reeling-in operation.

43. A method as claimed in claim 42, further comprising the steps of monitoring the machine's velocity sensors and tachometer for signals indicating turbine overspeed and causing activation of the machine's turbine brake to deactivate the turbine in the event of turbine overspeed.

* * * * *